(12) United States Patent
Rotman et al.

(10) Patent No.: US 12,045,717 B2
(45) Date of Patent: Jul. 23, 2024

(54) AUTOMATIC CREATION OF DIFFICULT ANNOTATED DATA LEVERAGING CUES

(71) Applicant: INTERNATIONAL BUSINESS MACHINES CORPORATION, Armonk, NY (US)

(72) Inventors: Daniel Nechemia Rotman, Haifa (IL); Yevgeny Yaroker, Haifa (IL); Udi Barzelay, Haifa (IL); Joseph Shtok, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 17/116,321

(22) Filed: Dec. 9, 2020

(65) Prior Publication Data

US 2022/0180182 A1    Jun. 9, 2022

(51) Int. Cl.
*G06N 20/00* (2019.01)
*G06N 3/063* (2023.01)
*G06N 3/08* (2023.01)

(52) U.S. Cl.
CPC ............... *G06N 3/08* (2013.01); *G06N 3/063* (2013.01)

(58) Field of Classification Search
None
See application file for complete search history.

(56) References Cited

U.S. PATENT DOCUMENTS

| 2002/0107940 | A1* | 8/2002 | Brassil | H04N 21/23424 709/219 |
| 2017/0319123 | A1* | 11/2017 | Voss | G06V 10/945 |
| 2018/0060757 | A1 | 3/2018 | Li | |
| 2019/0065911 | A1* | 2/2019 | Lee | G06N 3/042 |
| 2019/0251397 | A1 | 8/2019 | Tremblay | |

FOREIGN PATENT DOCUMENTS

| JP | 2022540263 | * | 9/2022 |
| WO | 20200391211 | W | 2/2020 |

OTHER PUBLICATIONS

Amrani, Elad, Rami Ben-Ari, Tal Hakim, and Alex Bronstein. "Toward Self-Supervised Object Detection in Unlabeled Videos." arXiv preprint arXiv:1905.11137 (2019).
Ben-Ari, Rami, Aviad Zlotnick, and Sharbell Hashoul. "A weakly labeled approach for breast tissue segmentation and breast density estimation in digital mammography." In 2016 IEEE 13th International Symposium on Biomedical Imaging (ISBI), pp. 722-725. IEEE, 2016.

(Continued)

*Primary Examiner* — David R Vincent
(74) *Attorney, Agent, or Firm* — Stosch Sabo

(57) ABSTRACT

A system and method for generating hard training data from easy training data. Training data including visual data with synthetic semantic implants ("VSSI") having at least one cue is received. An annotator identifies at least one cue in the VSSI and annotates the VSSI to indicate the cue to create a modified training data set. A data scrambler removes at least one cue from the VSSI to create the tagged training data, which can then be used to train a classifier to identify transitions between segments when the cues are not present.

12 Claims, 5 Drawing Sheets

(56) References Cited

OTHER PUBLICATIONS

Chen, Lei, and M. Tamer Ozsu. "Rule-based scene extraction from video." In Proceedings. International Conference on Image Processing, vol. 2, pp. II-II. IEEE, 2002.

Ellouze, M., Boujemaa, N. & Alimi, A.M. Scene pathfinder: unsupervised clustering techniques for movie scenes extraction. Multimed Tools Appl 47, 325-346 (2010). https://doi.org/10.1007/s11042-009-0325-5.

Schwartz, Eli, Leonid Karlinsky, Joseph Shtok, Sivan Harary, Mattias Marder, Abhishek Kumar, Rogerio Feris, Raja Giryes, and Alex Bronstein. "Delta-encoder: an effective sample synthesis method for few-shot object recognition." In Advances in Neural Information Processing Systems, pp. 2845-2855. 2018.

Tobia Tesan, Pasquale Coscia, Lamberto Ballan: A CNN-RNN Framework for Image Annotation from Visual Cues and Social Network Metadata. CoRR abs/1910.05770 (2019).

* cited by examiner

AUTOMATIC CREATION OF DIFFICULT ANNOTATED DATA LEVERAGING CUES

BACKGROUND

The present disclosure relates to creating training data to train a classifier, and more specifically generating training data without segment transition cues from data having the cues.

Deep learning is a powerful tool for creating computer vision technologies. Usually, to perform well, the deep learning model must have a large amount of annotated data. Annotating this data can be costly, and for "difficult" tasks or situations annotation might be difficult even for humans, however these are usually the most interesting and desirable instances to give the learning model.

SUMMARY

Embodiments of the present disclosure are directed to a system for generating training data. The system includes a set of training data, an annotator, and a data scrambler. The training data includes visual data with synthetic semantic implants ("VSSI") having at least one cue. The annotator identifies at least one cue in the VSSI, and annotates the VSSI to indicate the identified cue to create a modified training data set. The data scrambler removes at least one cue from the VSSI to create the tagged training data, which can then be used to train a classifier to identify transitions between segments when the cues are not present.

Embodiments of the present disclosure are directed to a method for generating training data to train a classifier. Training data is received. The training data includes at least one data stream having at least one cue, the cue indicates a transition between a first segment and a second segment in the data stream. The training data is annotated by identifying cues in the data stream and the data stream is annotated to indicate the transition. Once annotated a modified training data set is created. A tagged training data set is created by removing the identified cues from the modified data set.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
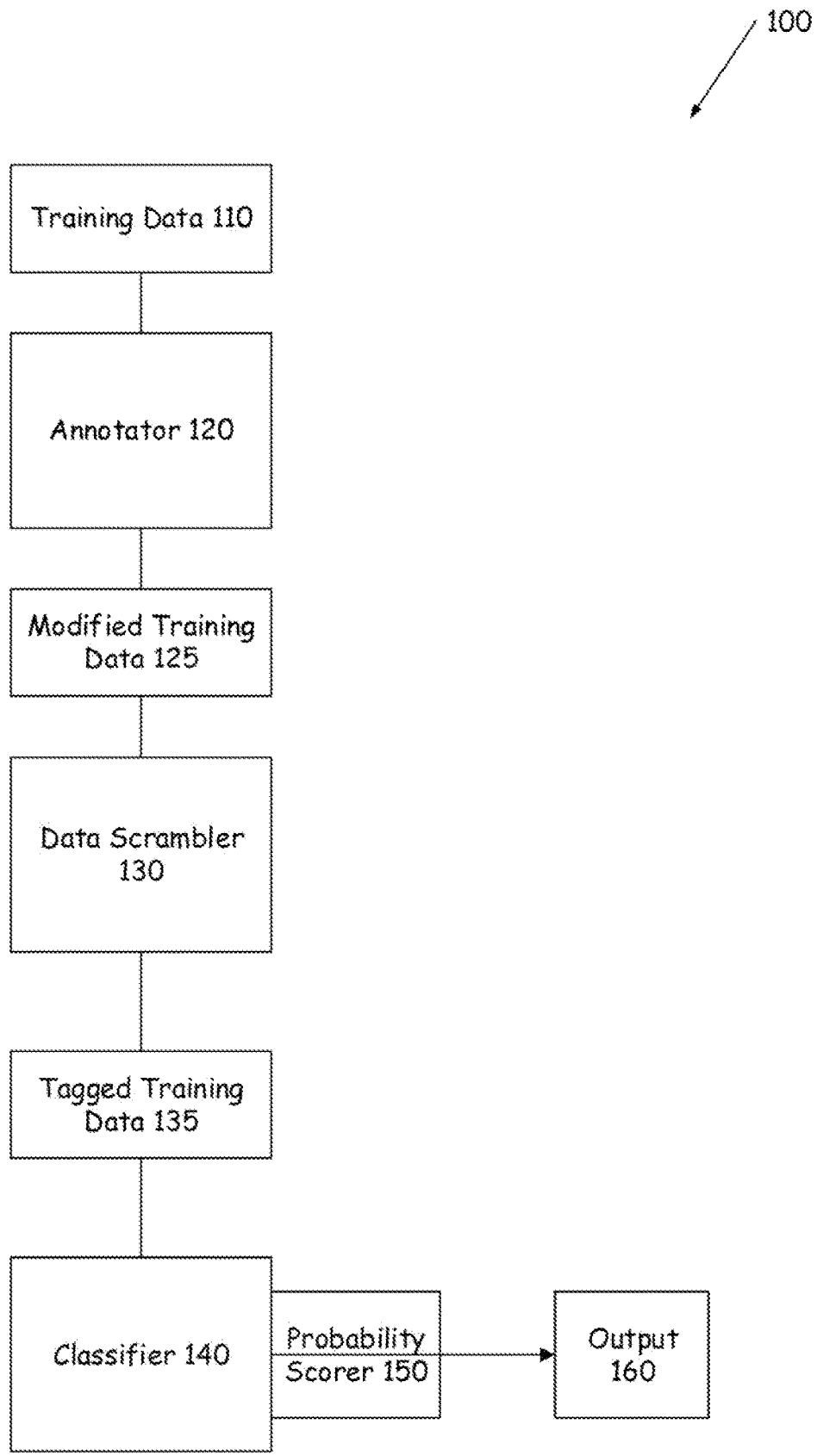
FIG. 1 is a block diagram illustrating a system for creating annotated training data according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to creating training data to train a classifier, and more specifically generating training data without segment transition cues from data having the cues or visual data with synthetic semantic implants. While the present disclosure is not necessarily limited to such applications, various aspects of the disclosure may be appreciated through a discussion of various examples using this context.

In order to train computer vision technologies a large amount of annotated data is needed to train the models. Annotating this data can be costly and for challenging task or situations the annotation can be difficult even for humans. However, these challenging situations are often the best situations to train the models with. One area where challenging situations can occur is with data streams, such as news programs, talk shows, sporting events and movies. Often times there are cues within the data stream to indicate that there has been a change in the segment or topic. However, in some instances this cue is not present in the data stream. As the models were often trained using data streams that included the cues, the model will often fail to identify a change in segment when the cue is not present. This can occur because the model was trained using the cues and thus learned the cues and not other reasons for making the particular identification. To train the models using these challenging situations is difficult due to the limited availability of annotated data sets that have the feature of segments without the cues. To quickly and easily generate this particular type of training data, FIG. 1 is a block diagram illustrating a system for creating annotated training data 110 for difficult and challenging examples. System includes a training data 110, an annotator 120, a data scrambler 130, a classifier 140, and a scorer 150.

The training data set is a set of data that is used to train the classifier 140. The training data 110 has a number of data sets that are designed to produce a first result and a number of data sets that are designed to produce a second result. Depending on the intent of the classifier 140 there may be more training data 110 data sets that are designed to produce different results. Each of the data sets in the training data 110 has a number of features that are present in the data set that help cause the data set to cause the classifier 140 to report the particular data set in a particular way. In some embodiments the training data 110 is stream data where there are a number of segments within the data stream. For example, the data stream can be a news broadcast that has a number of different segments, a sports broadcast, a talk show, a movie, or any other data stream that includes segments. The training data 110 also includes at least one cue in the data stream that indicates a transition between one segment of the data stream to another segment of the data stream. These data streams in the training data 110 include cues in the data stream that indicate that there is a change between segments. It should be noted that the data streams can be audio, video, text, or any combination thereof. In some embodiments the training data 110 is visual data with synthetic semantic implants ("VSSI"). VSSI can include, for example, the data streams discussed above such as a news feed with graphical segments between stories, story number overlay, running text lines, etc. VSSI can also include images that have textual frame overlays with metadata on the image, results of measurements, diagnosis, etc. This type of VSSI does not have data occurring over a stream but is a static image containing cues with the image.

The annotator 120 is a component of the system that is configured to annotate the training data 110 to identify the locations in the training data sets the various segments in the data stream. The annotator 120 is configured to identify the cues that are present in the data stream and annotates the data stream to indicate that the transition occurred at this particular location within the data stream. The annotator 120 can use any method for identification of the cue and to annotate the data stream accordingly. For example in a news broadcast the annotator 120 can identify a change in a news segment based on a cue such a graphic placed on the screen, a change from a video presentation to a shot of the anchor, a running counter indicating a story number, or a particular phase is uttered (e.g. "lets go to the video"). In an example where the data stream is a sporting event, the annotator 120 can identify cues such as a change in the scoreboard (e.g. a score change), cheers of a crowd, a cut to a commercial, etc. In the example of a talk show the annotator 120 identifies the cue from the data stream by, for example, the playing of music indicating the end of a segment, a particular phrase (e.g. "we will be right back"), etc. In the case of a movie or film, the annotator 120 can employ video scene detection which uses editing rules to identify changes between scenes. For example, the annotator 120 can identify a cue from a fade transition that is used on scene boundaries. The annotations that are placed on the data streams within the training data 110 can be any type of annotation that would allow the classifier 140 to learn about the segment transition.

The annotator 120 outputs the training data 110 with the data streams annotated as modified training data 125. The modified training data 125 includes both the annotations and the cues. However, as the cues are present in the modified training data 125, it is detrimental to the training of the classifier 140 as the learning algorithm in the classifier 140 will learn the transition based on the cue and when presented with a data stream lacking the cue will not be able to accurately identify the transition between segments. To allow for better training of the classifier 140 on data streams without cues indicating the transition has occurred, the modified training data 125 is provided to a data scrambler 130.

The data scrambler 130 is a component of the system that is configured remove the cue from the modified training data 125. To remove the cue from the modified training data 125 the data scrambler 130 uses the same approach that the annotator 120 used to identify the cues in the data stream. When the cue is found in the data stream, the data scrambler 130 simply removes the cue from the data stream, while leaving the annotations that the annotator 120 had placed on the data stream in place. Once the cues are removed from the modified training data 125 the data scrambler 130 outputs a set of tagged training data 135 for training the classifier 140.

The classifier 140 is a component of the system that is configured to identify transitions between segments within a data stream. The classifier 140 identifies the transitions between segments by applying a rule or rules to the data stream that identify the segments from within the data stream. These rules are trained using machine learning models that have been trained on data such as training data 110 and the tagged training data 135. By passing each of the training data sets through the classifier 140 the classifier 140 is able to become calibrated to the specific data results that the user or other organization desires. The more training data 110 that is processed through the classifier 140 the more the classifier 140 is able to tune or modify the rules that are used to generate a particular output 160. The classifier 140 can use any rules or processes available to classify or otherwise produce the output 160 from the input data, such as the training data 110, the tagged training data 135 or any other input and results in an output 160 indicating the various segments in the data stream.

The classifier 140 can employ various machine learning techniques in making their predictions. Machine learning techniques can comprise algorithms or models that are generated by performing supervised, unsupervised, or semi-supervised training on a dataset and subsequently applying the generated algorithm or model to generate a corresponding output 160 based on the machine learning model. For example, the classifier 140 can output 160 a series of segments for a data stream that can allow the data stream to be served up to a user in segments instead of an entire program. Machine learning algorithms can include but are not limited to decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier 140, naïve Bayes classifier 140, binary classifier 140, linear classifier 140, hierarchical classifier 140, canonical correlation analysis (CCA), factor analysis, independent component analysis (ICA), linear discriminant analysis (LDA), multidimensional scaling (MDS), non-negative metric factorization (NMF), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The output 160 of the classifier 140 can simply contain the determined result, i.e. the indication of the segments in the data stream. However, in some embodiments the output 160 also includes a probability that the determination by the classifier 140 is in fact correct. To obtain the probability the classifier 140 passes the output 160 through a scorer 150. The scorer 150 can be part of the classifier 140 or it may be a separate component of the system. The scorer 150 is configured to calculate the likelihood that the classifier 140 has produced the correct result. Alternatively, the scorer 150 is configured to identify the portion of the results that caused the classifier 140 to classify the result in the manner that it did. For example, if the classifier 140 merely outputs a score for the classification and that score is compared to a rule for the decision, the scorer 150 can calculate the delta between the determined score and the score needed to cause the decision to be made. The scorer 150 can use any method, process or means for calculating the probability or score.

Figure 2:
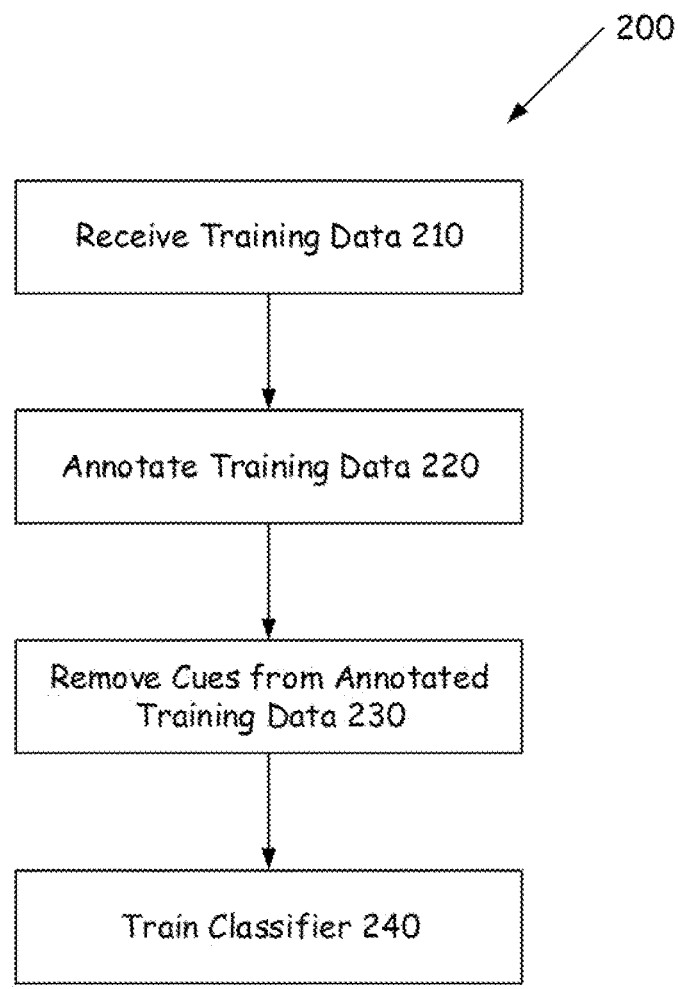
FIG. 2 is a flow diagram illustrating a process for training a classifier to identify segments from a data stream according to embodiments.

FIG. 2 is a flow diagram illustrating a process for training a classifier 140 to identify transitions between segments from a data stream. The process begins by receiving a corpus of training data 110. This is illustrated at step 210. The training data 110 includes a number of training data sets that include data streams. The data streams can be video streams, audio streams, text streams, or combinations thereof. Further, each of the data streams includes one or more cues within the data stream that indicates a transition from one segment to another segment has occurred. These indications can include, for example, fading of a scene, a catch phrase, a countdown list, crowd noise, etc.

The training data 110 is then provided to an annotator 120 to annotate the training data sets. This is illustrated at step 220. The annotator 120 takes the data streams in the training data 110 and identifies the particular indications that a transition between the segments has occurred. The annotator 120 can use any deterministic approach for identifying the cues in the data stream. The annotator 120 then annotates the data stream when it finds each of the queues.

The modified training data 125 which now includes both annotations and the cues is then sent to the data scrambler 130 to remove the cues from the modified training data 125. This is illustrated at step 230. The data scrambler 130 employs the same approach as the annotator 120 used to identify the cues. When the data scrambler 130 identifies a cue within the data stream the process proceeds to remove the cue from the actual data stream. The results of the data scrambler 130 is tagged training data 135 that has the cues removed.

The tagged training data 135 is then provided to the classifier 140 for training. This is illustrated at step 240. The classifier 140 processes the tagged training data 135 to identify the segments in the training data 110 using a series of rules or rules. As the intended results of the tagged training data 135 is known, machine learning models can be employed to modify the rule or rules used for the classification to obtain the desired results.

Figure 3:
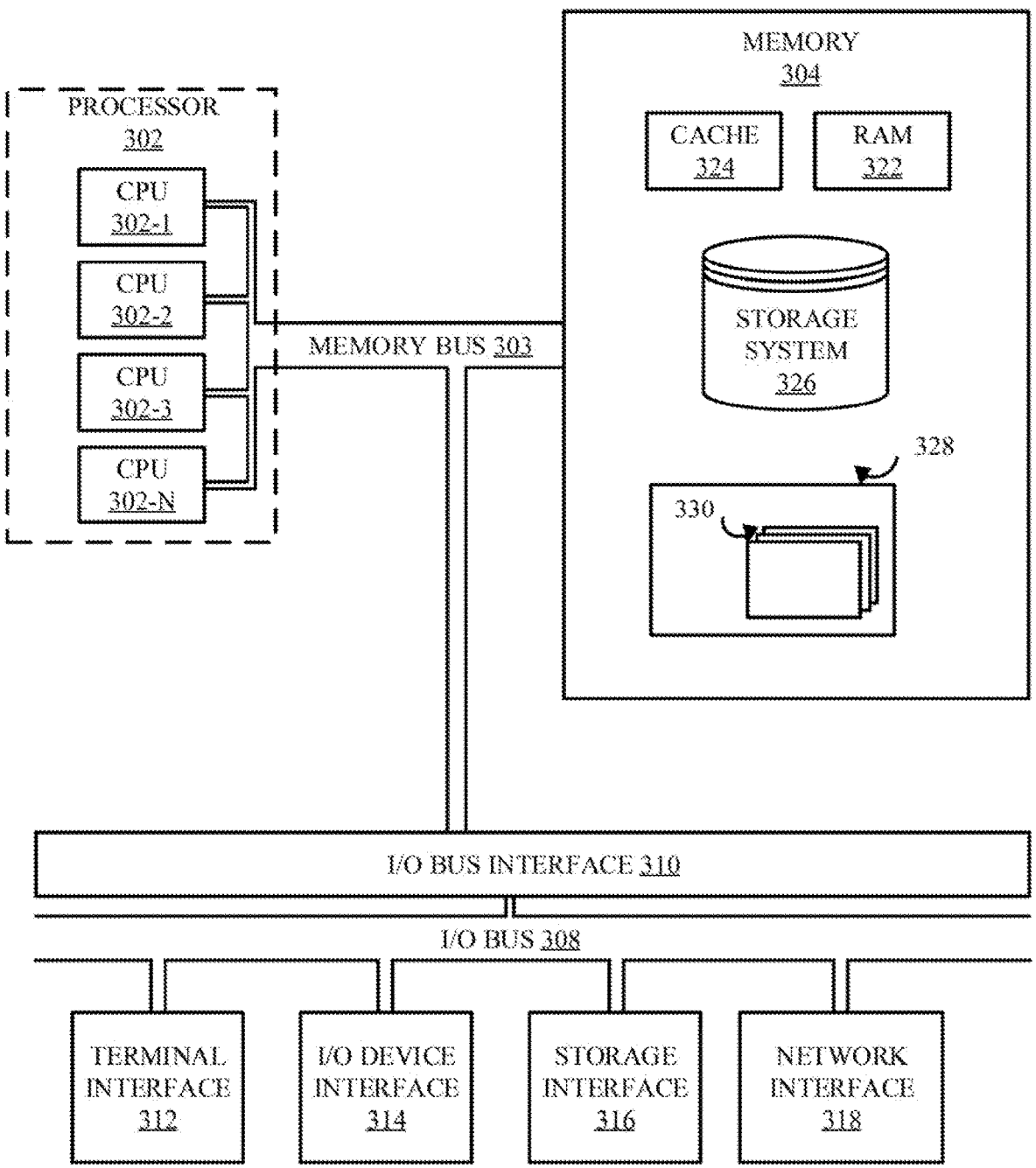
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
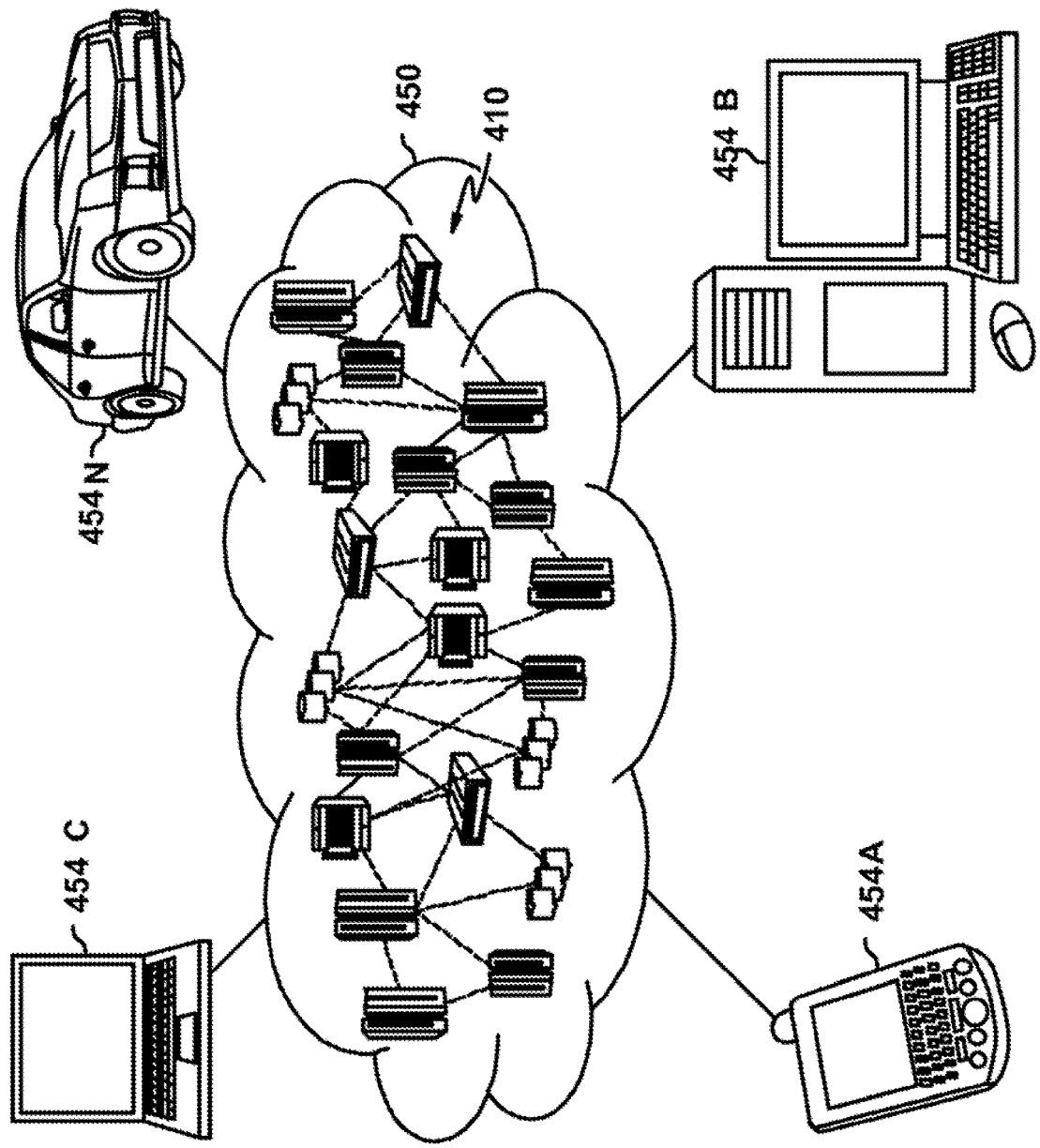
FIG. 4 is a diagrammatic representation of an illustrative cloud computing environment.

The system 100 may be employed in a cloud computing environment. FIG. 4, is a diagrammatic representation of an illustrative cloud computing environment 450 according to one embodiment. As shown, cloud computing environment 450 comprises one or more cloud computing nodes 454 with which local computing devices used by cloud consumers, such as, for example, personal digital assistant (PDA) or cellular telephone 454A, desktop computer 454B, laptop computer 454C, and/or automobile computer system 454N may communicate. Nodes 454 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 454 and cloud computing environment 450 may communicate with any type of computerized device over any type of network and/or network addressable connection (e.g., using a web browser).

Figure 5:
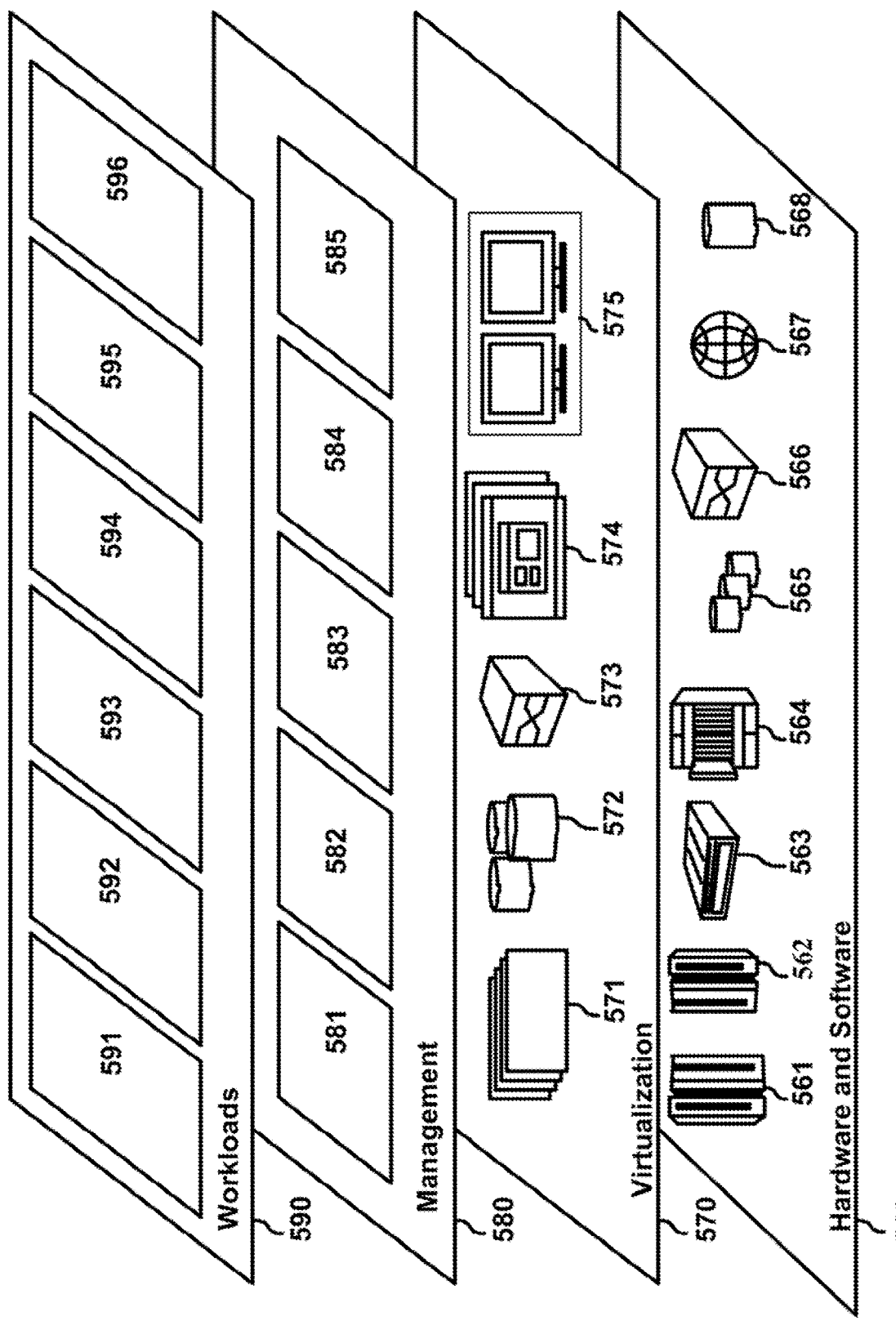
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; layout detection 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for generating training data to train a computer vison system to identify transitions in audio and video data in the absence of cues in the audio and video data comprising:
    a set of training data, including the audio and video data, wherein the audio and video data includes at least one cue, and wherein the at least one cue indicates a transition between a first segment and a second segment in the audio and video data;
    an annotator configured to programmatically identify the at least one cue in the audio and video data, and to annotate the audio and video data to indicate the at least one cue to create a modified training data set;
    a data scrambler configured programmatically remove the at least one cue from the audio and video data to create a tagged training data; and
    a classifier configured to identify transitions between segments from new audio and video data, wherein the classifier is trained using machine learning based upon the tagged training data to identify transitions between segments in the absence of cues in the audio and video data indicating the transitions.

2. The system of claim 1 further comprising:
    a scorer configured to determine a probability that the classifier correctly identified segments in the audio and video data.

3. The system of claim 1 wherein the at least one cue is an audio cue in the audio and video data.

4. The system of claim 1 wherein the at least one cue is identified based upon editing rules.

5. A method for training a classifier to identify a transition between two segments in a audio and video data in the absence of a transition cue in the audio and video data, comprising:
    receiving training data, the training data including the audio and video data, the audio and video data including at least one cue, the at least one cue indicating a transition between a first segment and a second segment in the audio and video data;
    annotating the training data by identifying cues in the audio and video data and annotating the audio and video data to indicate the transition and to create a modified training data set;
    removing from the modified training data set the identified cues to create a tagged training data set; and
    training the classifier using the tagged training data set to identify transitions between segments in the absence of cues.

6. The method of claim 5 wherein the at least one cue is identified using editing rules.

7. A method for training a classifier to identify a transition between two segments in an image in the absence of a transition cue in the image, comprising:
    receiving training data, the training data including an image, wherein the image includes at least one cue, the at least one cue indicating a transition between a first segment and a second segment in the image;
    annotating the training data by identifying cues in the image and annotating the image to indicate the transition and to create a modified training data set;
    removing from the modified training data set the identified cues to create a tagged training data set; and
    training the classifier using the tagged training data set to identify transitions between segments in the absence of cues.

8. The method of claim 7, wherein the at least one cue is a textual overlay containing metadata.

9. The method of claim 7, wherein the at least one cue is identified using editing rules.

10. The method of claim 7, further comprising:
    determining a probability that the classifier correctly identified segments in new images.

11. The method of claim 5, further comprising:
    determining a probability that the classifier correctly identified segments in the audio and video data.

12. The method of claim 5, wherein the at least one cue is an audio cue in the audio and video data.

* * * * *